United States Patent Office 3,066,172
Patented Nov. 27, 1962

3,066,172
PROCESS FOR THE PURIFICATION OF NITROCYCLOHEXANE
Ollie W. Chandler, Terre Haute, Ind., assignor to Commercial Solvents Corporation, New York County, N.Y., a corporation of Maryland
No Drawing. Filed Dec. 27, 1960, Ser. No. 78,296
9 Claims. (Cl. 260—644)

My invention relates to the purification of nitrocyclohexane, and more particularly it relates to an improved process for purifying nitrocyclohexane by treatment with a sulfur-containing material.

Nitrocyclohexane, a compound used in the formation of caprolactam, is produced with accompanying adipic acid by the nitration of cyclohexane with nitric acid according to the process described in U.S. Patent 2,343,534 granted March 7, 1944, to R. M. Cavanaugh et al. Caprolactam is then produced from nitrocyclohexane by a reduction of the nitrocyclohexane to the intermediate cyclohexanone oxime in the presence of a reduction catalyst and subsequent conversion of the oxime to the lactam.

In order to obtain proper reduction of nitrocyclohexane, it is first necessary to remove impurities from the nitrocyclohexane. The reaction of cyclohexane and nitric acid, when conducted according to the process of the above-named patent, produces a two-phase reaction mixture, an aqueous phase which contains adipic acid and an oil phase which contains the desired nitrocyclohexane, unreacted cyclohexane, and numerous oxidation products. The aqueous phase containing adipic acid is easily separated from the nitrocyclohexane by decantation. The remaining impure nitrocyclohexane can then be further purified by standard distillation procedures to remove unreacted cyclohexane, and the abovementioned oxidation products such as cyclohexanone, cyclohexanol, cyclohexyl nitrate, and cyclohexyl nitrite. However, standard distillation procedures fail to separate certain unidentified impurities which retard the reduction of nitrocyclohexane to cyclohexanone oxime. These unidentified reduction retarders not only greatly increase the time required for reduction of nitrocyclohexane but concurrently destroy the further effectiveness of reducing catalysts. Therefore, in order to obtain satisfactory reduction of nitrocyclohexane to cyclohexanone oxime and retain the usefulness of the reducing catalysts, it is first necessary to remove these reduction retarding impurities.

I have now discovered an improved process for purifying nitrocyclohexane whereby reduction retarding impurities can be removed therefrom.

My process consists generally of refluxing nitrocyclohexane with a sulfur-containing material selected from the group consisting of sulfurous acid and its water soluble acid and neutral salts and separating the sulfur-containing material from the nitrocyclohexane. In carrying out the process of my invention, I prefer to apply my process to partially purified nitrocyclohexane by first removing the major impurities found in the cyclohexane-nitric acid reaction mixture from the nitrocyclohexane. As previously stated, adipic acid is preferably first removed by decantation. Unreacted cyclohexane and volatile oxidation products such as cyclohexanol, cyclohexanone, cyclohexyl nitrate, and cyclohexyl nitrite are then removed by distillation. The partially purified nitrocyclohexane containing the unidentified reduction retarding impurities is then refluxed with the sulfur-containing material and the sulfur-containing material is then separated from the nitrocyclohexane. Included among the water soluble neutral and acid salts of sulfurous acid which are operative in my invention are sodium bisulphite, ammonium bisulphite, potassium bisulphite, sodium sulphite, ammonium sulphite, potassium sulphite, etc., and the like.

The amount of sulfur-containing material necessary to properly purify nitrocyclohexane naturally will vary depending on the amount of impurities contained in individual reaction mixtures. Generally, however, I have found that as low as 1% of sulfur-containing material by weight, based on the weight of the nitrocyclohexane to be purified is sufficient to remove reduction retarding impurities. Occasionally, however, to obtain maximum results it is necessary to utilize as high as 20% by weight of sulfur-containing material.

In order to obtain proper separation of the sulfur-containing material from the nitrocyclohexane after reflux is discontinued, it is generally preferable to utilize aqueous solutions of sulfur-containing material. The presence of water permits ready formation of an aqueous phase having therein the sulfur-containing material which is easily separated from the nitrocyclohexane by decantation. Generally, solutions having a concentration of about 15 to about 25% of sulfur-containing material are most suitable.

Since the reflux step of my invention is preferably conducted at atmospheric pressures, any suitable distillation apparatus equipped for total reflux can be utilized.

The following example serves to illustrate my invention, but it is not intended that my invention be limited to the procedures, conditions, or specific materials set forth in this specific example.

*Example I*

A 1,000-gram portion of previously partially purified nitrocyclohexane of 99.1% purity was divided into two equal portions. To the first of the equal portions were added 250 grams of 20% aqueous sodium bisulphite and the resulting mixture was refluxed for a period of 3 hours at atmospheric pressure utilizing a temperature of from about 100 to about 105° C. The refluxed material was cooled to room temperature and the aqueous bisulphite containing phase was separated from the nitrocyclohexane by decantation. The nitrocyclohexane was then distilled at 40 mm. at from about 105–110° C. for about 2 hours. The second portion was then distilled at 40 mm. at from about 105–110° C. for about two hours. The two portions were then separately subjected to hydrogenation at 1,000 p.s.i.g. at temperatures of about 130 to about 140° C. in the presence of a silver oxide-zinc oxide-chromium oxide-calcium oxide catalyst. Hydrogenation of the bisulphite refluxed material was complete after 25 minutes while hydrogenation of the material not subjected to reflux with bisulphite required 2 hours and 30 minutes. Thus, my improved process demonstrates a six-fold reduction in hydrogenation time.

*Example II*

The procedure of Example I was followed utilizing 98.9% pure nitrocyclohexane with the exception that 200 grams of water and 29 grams of sodium sulphite were utilized instead of aqueous sodium bisulphite. Hydrogenation of the sodium sulphite refluxed material was complete after 45 minutes while hydrogenation of the material not subjected to reflux with sodium sulphite required 2 hours and 39 minutes.

*Example III*

A 1,000-gram portion of previously purified nitrocyclohexane of 98.8% purity was divided into two equal portions. Both portions were refluxed for a period of three hours with 200 grams of water. The first of the said portions was sparged with a total of 50 grams of sulfur dioxide during the three-hour reflux period. The refluxed material was cooled to room temperature and the aqueous sulfur containing phase was separated from the nitrocyclohexane by decantation. The nitrocyclohexane was then distilled at 40 mm. at from about 105–110° C. for about 2 hours. The second portion was then distilled at 40 mm. at from about 105–110° C. for about two hours. The two portions were then separately subjected to hydrogenation at 1,000 p.s.i.g. at temperatures of about 130 to about 140° C. in the presence of a silver oxide-zinc oxide-chromium oxide-calcium oxide catalyst. Hydrogenation of the sulfur dioxide treated material was complete after 2 hours and 10 minutes while hydrogenation of the material not subjected to reflux with sulfur dioxide required 3 hours and 47 minutes.

Now having described my invention, what I claim is:

1. A process for the purification of nitrocyclohexane, said nitrocyclohexane having been prepared by the nitration of cyclohexane which comprises refluxing partially purified nitrocyclohexane in the presence of a sulfur-containing material selected from the group consisting of sulfurous acid and its water soluble neutral and acid salts and separating the sulfur-containing material therefrom.

2. A process for the purification of nitrocyclohexane, said nitrocyclohexane having been produced by the nitration of cyclohexane which comprises refluxing partially purified nitrocyclohexane in the presence of from about 1 to about 20% by weight of a sulfur-containing material selected from the group consisting of sulfurous acid and its water soluble neutral and acid salts based on the weight of the nitrocyclohexane and separating the sulfur-containing material from the nitrocyclohexane.

3. The process of claim 2 wherein the sulfur-containing material utilized is sodium bisulphite.

4. The process of claim 2 wherein the sulfur-containing material is ammonium bisulphite.

5. The process of claim 2 wherein the sulfur-containing material is potassium bisulphite.

6. The process of claim 2 wherein the sulfur-containing material is sulfurous acid.

7. The process of claim 2 wherein the sulfur-containing material is sodium sulphite.

8. The process of claim 2 wherein the sulfur-containing material is potassium sulphite.

9. The process of claim 2 wherein the sulfur-containing material is ammonium sulphite.

References Cited in the file of this patent

UNITED STATES PATENTS

| | | |
|---|---|---|
| 1,297,524 | Wollenberg et al. | Mar. 18, 1919 |
| 2,401,879 | McKee | June 11, 1946 |